(12) United States Patent
Takizawa

(10) Patent No.: US 11,125,256 B2
(45) Date of Patent: Sep. 21, 2021

(54) ADHESIVE SHEET-SHAPED MEMBER FOR AIRFLOW AND TRAVEL VEHICLE USING THE SAME

(71) Applicant: Shinichi Takizawa, Nagano (JP)

(72) Inventor: Shinichi Takizawa, Nagano (JP)

(*) Notice: Subject to any disclaimer, the term of this patent is extended or adjusted under 35 U.S.C. 154(b) by 24 days.

(21) Appl. No.: 16/760,362

(22) PCT Filed: Dec. 10, 2018

(86) PCT No.: PCT/JP2018/045200
§ 371 (c)(1),
(2) Date: Apr. 29, 2020

(87) PCT Pub. No.: WO2019/117051
PCT Pub. Date: Jun. 20, 2019

(65) Prior Publication Data
US 2021/0071691 A1   Mar. 11, 2021

(30) Foreign Application Priority Data

Dec. 15, 2017 (JP) .............................. JP2017-240270
Jun. 11, 2018 (JP) .............................. JP2018-110780

(51) Int. Cl.
*F15D 1/00* (2006.01)
*B62D 35/00* (2006.01)
*B62D 37/02* (2006.01)

(52) U.S. Cl.
CPC ......... *F15D 1/0075* (2013.01); *B62D 35/007* (2013.01); *B62D 37/02* (2013.01)

(58) Field of Classification Search
CPC ... F15D 1/0075; F15D 1/0065; B62D 35/007; B62D 37/02; B62D 35/00
See application file for complete search history.

(56) References Cited

U.S. PATENT DOCUMENTS 3,529,862 A * 9/1970 Jousserandot ......... B62D 35/00
296/180.1
4,180,290 A * 12/1979 Drews .................... B62D 35/00
296/181.5

(Continued)

FOREIGN PATENT DOCUMENTS

| JP | S61278500 A | 12/1986 |
|---|---|---|
| JP | S62275878 A | 11/1987 |

(Continued)

*Primary Examiner* — Lori L Lyjak
(74) *Attorney, Agent, or Firm* — Muncy, Geissler, Olds & Lowe, P.C.

(57) ABSTRACT

Provided are: an adhesive sheet-shaped member for airflow, in an optimum form that can improve fuel efficiency and travel performance as a result of more effectively suppressing a large airflow separation phenomenon that becomes air resistance; and a travel vehicle using the same. A sheet-shaped member that is: provided thinly so as to prevent, as far as possible, the thickness thereof providing air resistance; adhered to a surface in contact with an airflow provided by a material that charges negative static electricity; formed in a long sheet shape in a flow direction of airflow, compared to the width direction of the airflow, so as to be adhered along the direction of the airflow; and provided using a material that charges a negative static electricity and has a different ease of static electrical charge than the surface in contact with the airflow.

5 Claims, 4 Drawing Sheets

(56) References Cited

U.S. PATENT DOCUMENTS

| | | | | |
|---|---|---|---|---|
| 4,284,302 | A * | 8/1981 | Drews | B64C 21/10 296/181.5 |
| 6,412,853 | B1 * | 7/2002 | Richardson | B62D 35/00 296/180.1 |
| 7,059,662 | B1 * | 6/2006 | Drews | B62D 35/00 296/180.1 |
| 9,394,011 | B1 * | 7/2016 | Hanagan | B62D 35/00 |
| 2006/0134379 | A1 * | 6/2006 | Pulkka | B64C 21/10 428/141 |
| 2010/0090496 | A1 * | 4/2010 | Carlson | B62D 35/00 296/180.1 |
| 2011/0175395 | A1 * | 7/2011 | Guigne | B62D 35/007 296/180.3 |
| 2012/0255152 | A1 | 10/2012 | Evans | |
| 2014/0130923 | A1 | 5/2014 | Hu | |

FOREIGN PATENT DOCUMENTS

| | | |
|---|---|---|
| JP | S63125681 U | 8/1988 |
| JP | 200055014 A | 2/2000 |
| JP | 200150215 A | 2/2001 |
| JP | 200688880 A | 4/2006 |
| JP | 201007846 A | 1/2010 |
| JP | 6168157 B2 | 7/2017 |

* cited by examiner

ADHESIVE SHEET-SHAPED MEMBER FOR AIRFLOW AND TRAVEL VEHICLE USING THE SAME

TECHNICAL FIELD

The present invention relates to a sheet-shaped member for airflow, which will be adhered on a surface in contact with airflow and which is capable of reducing air resistance.

Conventionally, a sheet for suppressing airflow separation, which is adhered on an outer surface of a vehicle body, has a plurality of concaves, which are formed in an outer surface, and an adhesive layer, which is formed on a rear surface. By providing the adhesive layer on the rear surface of the sheet having the concaves, the concaves for suppressing airflow separation can be easily provided on the outer surface of the vehicle body by cutting the sheet to form into a shape corresponding to a required place of the outer surface of the vehicle body and adhering the cut sheet thereto (see Patent Literature 1). Further, similar technologies have been proposed (see Patent Literatures 3-4).

In a vehicle which is electrically insulated from a road surface and whose body positively is charged with static electricity by external factors, e.g., travel motion, a positively charged airflow, which flows around and along a surface of the vehicle body, separates from the surface of the charged vehicle body and changes to a separation flow at separating positions between vehicle constituting parts while travelling the vehicle, so it is required that positive electric potential of at least one of predetermined specific positions, which are selected from the separating positions and at which operation stability of the vehicle can be improved by restraining the airflow separation, must be lowered, thus a self-discharge type neutralization device, which is capable of neutralizing positive electric potential of the specific positions by self-discharge for generating negative air ions according to the positive electric potential, has been proposed (see Patent Literature 2). Note that, one of examples of the self-discharge type neutralization device is an adhesive tape including an electrically conductive metal foil and an electrically conductive adhesive film layer, e.g., electrically conductive aluminum wheel tape.

PRIOR ART DOCUMENT

Patent Literature

Patent Literature 1: Japanese Laid-open Patent Publication No. 2006-88880 (Page 1)
Patent Literature 2: Japanese Patent No. 6168175 (Claims and drawings)
Patent Literature 3: Japanese Laid-open Patent Publication No. 2001-50215
Patent Literature 4: Japanese Laid-open Patent Publication No. 2000-55014
Patent Literature 5: Specification of US Laid-open Patent Publication No. 2012/0255152

SUMMARY OF THE INVENTION

Technical Problem

A problem of the above described adhesive sheet-shaped member for airflow and a travel vehicle using the same is that an optimum form of the sheet-shaped member, which is capable of more effectively restraining a large airflow separation, has not been proposed.

Thus, an object of the present invention is to provide an adhesive sheet-shaped member for airflow having an optimum form capable of restraining a large airflow separation, which becomes air resistance, and improving fuel efficiency and travel performance, and a travel vehicle using the same.

Solution to the Problem

To achieve the object, the present invention has following structures.

The adhesive sheet-shaped member for air flow relating to the present invention is made thinly, as far as possible, so as not to become air resistance and being adhered to a place close to an end of a member which constitutes a surface in contact with an airflow and which is composed of a material charging negative static electricity, the sheet-shaped member is characterized in that the sheet-shaped member is formed in a long sheet shape in a flow direction of the airflow, compared to a width direction of the airflow, so as to be adhered along the direction of the airflow, at least three of the sheet-shaped members are capable of being adhered, in parallel in the width direction, on the surface in contact with the airflow, with clearances in each of which no sheet-shaped member having a width greater than that of the sheet-shaped member cannot be adhered, that the sheet-shaped member is composed of a material which charges negative static electricity and which can more easily negatively charge than the surface in contact with the airflow, that an outer surface of the sheet-shaped member which will contact the airflow is a rough surface, that an adhesive layer is formed on a rear surface, which acts as an adhesive surface, of the sheet-shaped member, a thickness of the sheet-shaped member including the adhesive layer is 0.2 mm or less, and that a planar shape of a rear end part of the outer surface in contact with the airflow of the sheet-shaped member is gradually made thinner toward the rear end.

In an embodiment of the adhesive sheet-shaped member for air flow relating to the present invention, a base material of the surface in contact with the airflow is urethan, and a base material of the sheet-shaped member is polyvinyl chloride.

In an embodiment of the adhesive sheet-shaped member for air flow relating to the present invention, a planar shape of a front-end part of the outer surface in contact with the airflow of the sheet-shaped member is rounded.

In an embodiment of the adhesive sheet-shaped member for air flow relating to the present invention, a planar shape of a front-end part of the outer surface in contact with the airflow of the sheet-shaped member is gradually made thinner toward the front-end.

In an embodiment of the travel vehicle using the adhesive sheet-shaped member of the present invention, at least three of the sheet-shaped members are adhered, in parallel in a width direction, on a surface of a vehicle body, in contact with an airflow, with clearances in each of which no sheet-shaped member having a width greater than that of the sheet-shaped member cannot be adhered.

Effects of the Invention

In the adhesive sheet-shaped member for airflow of the present invention and the travel vehicle using the same, superior and advantageous effects, which are to effectively restrain a large airflow separation becoming air resistance and to improve fuel efficiency and travel performance, can be obtained.

DESCRIPTION OF EMBODIMENTS

Embodiments of the adhesive sheet-shaped member relating to the present invention will now be described in detail with reference to the drawings (FIGS. 1-9).

An adhesive sheet-shaped member 10 relating to the present invention is formed into a sheet shape, will be adhered on a surface of an object in contact with an airflow, and is formed long in a flow direction of airflow and short in a width direction thereof so as to be adhered long in the direction of airflow; and an outer surface 13 of the sheet-shaped member is an embossed rough surface. Note that, the embossed rough surface is formed by, for example, emboss-processing, and a prescribed pattern is repeatedly and continuously formed therein. In the present embodiment, the pattern is designed to make an image a weave pattern of carbon fiber cloth, and the outer surface is embossed to conform the pattern, so that the outer surface of the sheet-member is formed as the rough surface (the surface including concaves and bosses formed within a range of a thickness of a sheet portion constituting the adhesive sheet-shaped member 10 for airflow).

Figure 1:
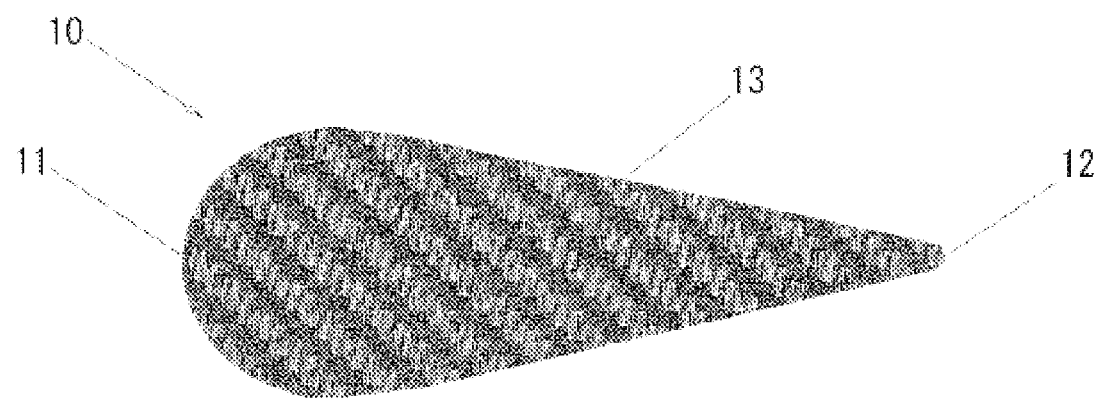
FIG. 1 A plan view of an example of the adhesive sheet-shaped member for airflow.
Figure 3:
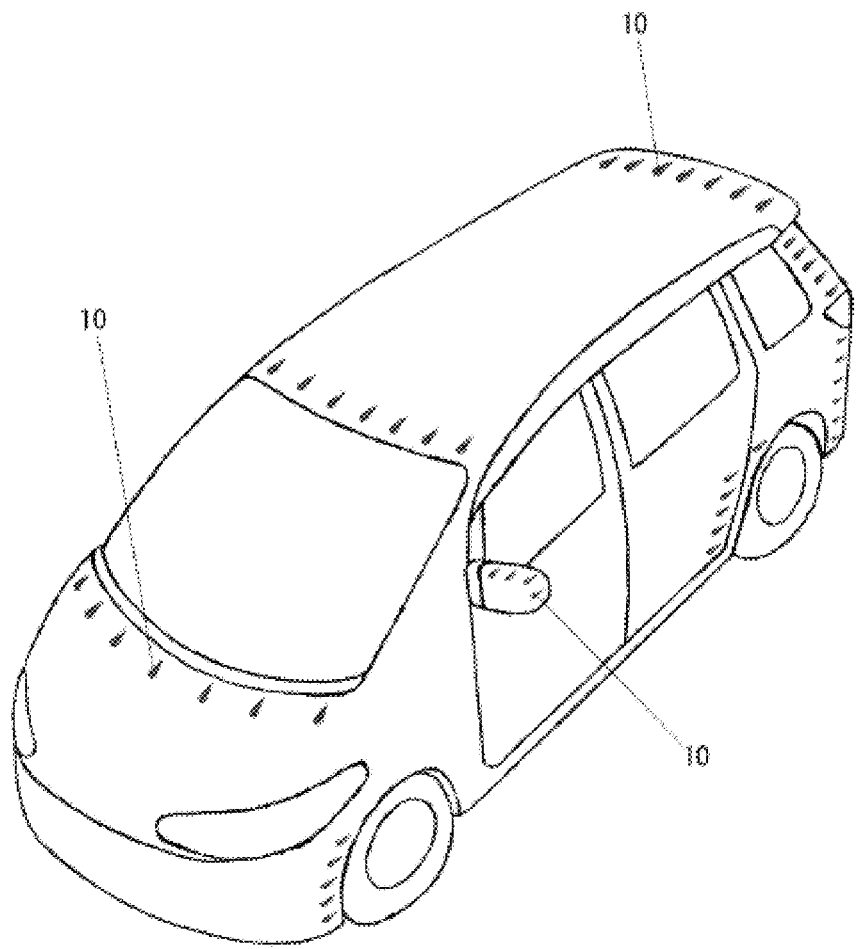
FIG. 3 A perspective view of an example of the travel vehicle using the adhesive sheet-shaped member for airflow of the present invention.
Figure 4:
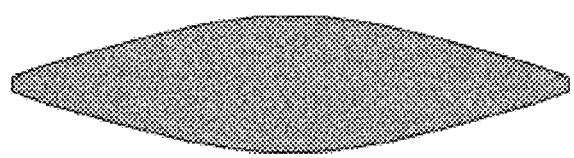
FIG. 4 A plan view of another example of the adhesive sheet-shaped member for airflow.

In each of embodiments shown in FIGS. 1 and 3, the sheet-shaped member is formed into a drop-like streamline shape, in which a planar front-end part 11 in contact with the airflow is rounded and a rear end part 12 in contact with the airflow is sharpened. Note that, the drop-like shape is an entirely thin and elongated shape, e.g., teardrop shape, drop shape. Further, the adhesive sheet-shaped member 10 can be optionally formed by, for example, die-cutting a broad sheet member, e.g., cutting sheet (registered trademark). By the way, a base material of the adhesive sheet-shaped member 10 of the present embodiment is polyvinyl chloride (PVC), which easily charges negative static electricity by friction, and air easily positively charges, so it is thought that the adhesive sheet-shaped member restrains airflow separation.

With the above described function, airflow separation can be effectively restrained, so that superior effects of improving fuel efficiency and travel performance can be obtained. Namely, the shape of the adhesive sheet-shaped member 10 of the present invention is capable of generating a linearly streak airflow, which is constituted by many small swirling flows continuously generated, so it is thought that airflow separation caused by a large swirling flow can be suitably prevented and restrained by the principle of vortex generator.

Figure 2:
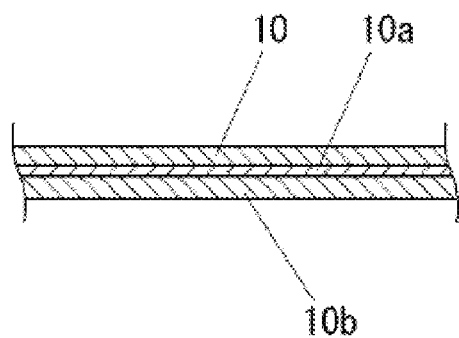
FIG. 2 A sectional view of the example of the adhesive sheet-shaped member for airflow.

In the adhesive sheet-shaped member 10 of the present embodiment, an adhesive layer 10a, to which an adhesive is applied, is provided to a rear surface thereof acting as an adhesive surface, and a thickness including the adhesive layer 10a is, as shown in FIG. 2, 0.5 mm or less. For example, the thickness of the adhesive sheet-shaped member 10 of the present embodiment including the adhesive layer 10a may be about 0.2 mm or less. Further, in the adhesive sheet-shaped member 10 for airflow, the adhesive layer 10a is protected by release paper 10b like general adhesive seal members, so that the adhesive sheet-shaped member can be easily adhered at a desired place in a surface of an object in contact with airflow (e.g., surface of a vehicle body).

In a travel vehicle relating to the present invention, a plurality of the sheet-shaped members 10 for airflow are adhered, in parallel in a width direction, on a surface of a vehicle body, in contact with an airflow, with clearances, each of which is greater than the width of the sheet-shaped member 10. In the present embodiment, as shown in FIG. 3, the adhesive sheet-shaped members 10 of the present embodiment are adhered, in the width direction almost at regular clearances, in prescribed places of the vehicle body where parts constituting the vehicle body are divided and airflow separation easily occurs.

The inventor of the present invention made the adhesive sheet-shaped members 10 for airflow by cutting a commercially produced iridescent cutting sheet (registered trademark) having an adhesive layer, adhered seven of the sheet-shaped members in the vicinity of a rear end part of an engine bonnet, (seven of the sheet-shaped members in the vicinity of a rear end part of a windshield) four of the small sheet-shaped members on an upper side part of each side mirror, seven of the sheet-shaped members in the vicinity of a rear part of a spoiler provided to an upper surface of a rear part of the vehicle body and five of the sheet-shaped members (including two small ones) in the vicinity of a rear end part of each side surface of the vehicle body, as shown in FIG. 3, and measured travel data of the vehicle; according to the measured travel data, fuel efficiency was improved about 5%. Note that, reducing fuel consumption gives a beneficial effect on countermeasures against global warming.

By employing the adhesive sheet-shaped members 10 for airflow relating to the present invention, many small swirling flows can be suitably generated, and extension of the small swirling flows in a width direction (transverse direction) can be suitably restrained because a width of the planar rear end part 12 is gradually reduced toward the end. Further, a plurality of the adhesive sheet-shaped members 10 for airflow are arranged in parallel with suitable clearances. With this structure, it is thought that a line of linear airflows, which are generated by many small swirling flows caused by the adhesive sheet-shaped members 10 for airflow, divide the airflow into a plurality of airflows in the width direction, so that forming a large swirling flow can be restrained, and aerodynamic characteristics can be improved.

Note that, number of the adhesive sheet-shaped members 10 for airflow of the present invention and adhering places thereof are not limited to the above described embodiment, and they may be optionally selected, so rational number of the sheet-shaped members may be adhered to rational places on the basis of functionality, design, etc. In case of adhering the adhesive sheet-shaped members 10 for airflow in a state where the rear end parts (the planar rear end parts 12) of the adhesive sheet-shaped members 10 for airflow are located near the places of the vehicle body at which members constituting the vehicle body are divided and airflow separations easily occur, as shown in FIGS. 3 and 5, aerodynamic characteristics can be effectively improved.

Figure 5:
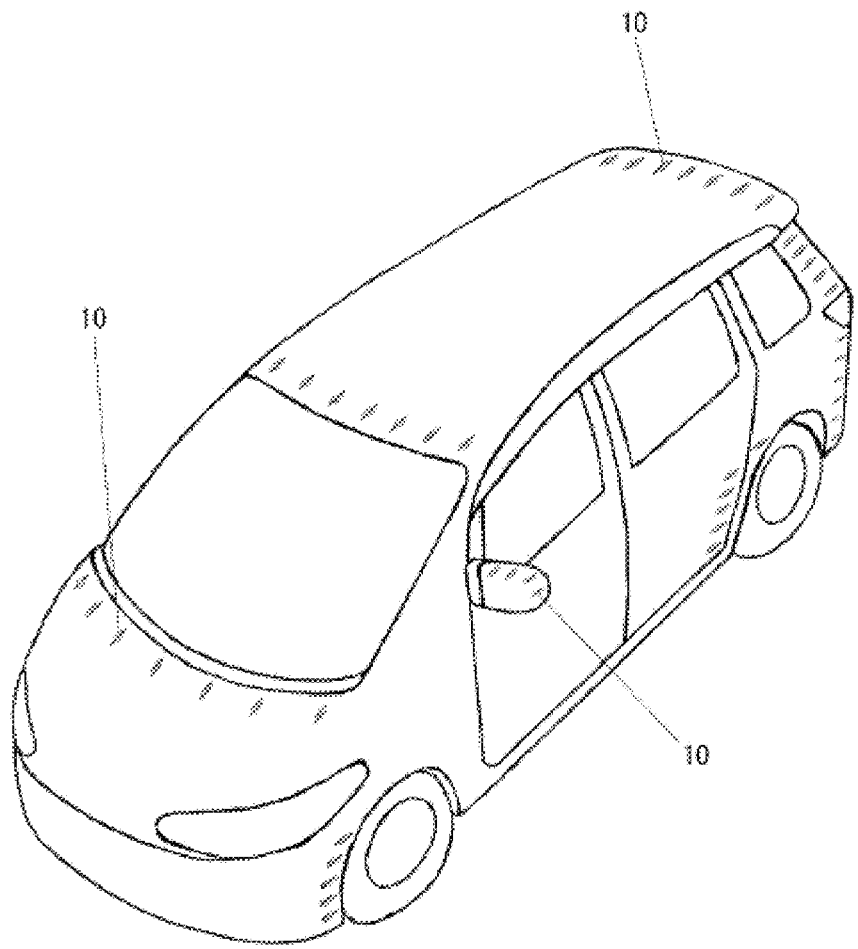
FIG. 5 A perspective view of another example of the travel vehicle using the adhesive sheet-shaped member for airflow of the present invention.
Figure 6:
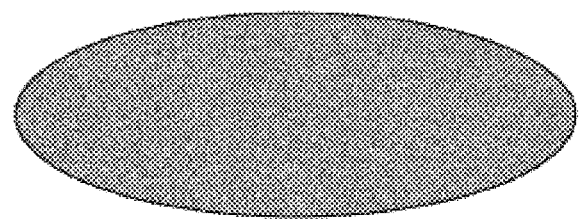
FIG. 6 A plan view of further example of the adhesive sheet-shaped member for airflow.
Figure 7:
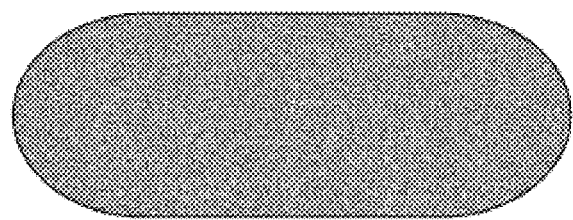
FIG. 7 A plan view of further example of the adhesive sheet-shaped member for airflow.
Figure 8:
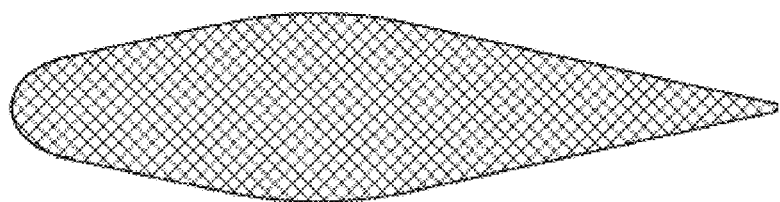
FIG. 8 A plan view of further example of the adhesive sheet-shaped member for airflow.
Figure 9:
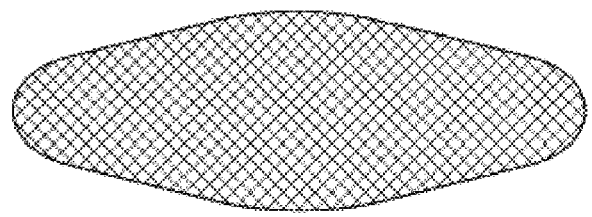
FIG. 9 A plan view of further example of the adhesive sheet-shaped member for airflow.

Side mirrors easily generate wind noise, but wind noise could be reduced by adhering the adhesive sheet-shaped members 10 for airflow of the present invention as shown in FIGS. 3 and 5. Conventionally, small bosses are provided to side mirrors as aero mirrors which are capable of reducing wind noise by principle of turbulent wing, but similar effects could be obtained in the present embodiment.

Karman vortex causing air resistance strongly generates at a position perpendicular to a surface flow, so it is effective to provide the sheet-shaped members to not only the above described spoiler and side mirrors but also other places of the vehicle body at which airflow separations occur (e.g., end parts) and Karman vortex generates, e.g., fenders (tire houses). By adhering the sheet-shaped members to the parts constituting the tire houses (e.g., front bumper, rear slide doors) as shown in FIGS. 3 and 5, noise generated when occurring Karman vortex could be reduced, and fuel efficiency could be improved. It is thought that sucking air into the tire houses are reduced and that deterioration of running performance of the vehicle caused by the air suction was prevented and running stability of the vehicle could be improved. Further, aerodynamic characteristics can be improved by adhering the adhesive sheet-shaped members 10 for airflow of the present invention to other places perpendicular to the surface flow, e.g., lower part of a rear bumper (not shown).

As described above, the adhesive sheet-shaped member 10 for airflow of the present invention is a thin sheet-shaped member having a thickness of 0.5 mm or less, preferably about 0.2 mm or less, is not three-dimensionally projected from the surface of the vehicle, and is a two-dimensional member capable of being easily adhered. By employing the adhesive sheet-shaped members of the present embodiment, the effect of reducing air resistance, which is equivalent to that obtained by a vortex generator constituted by small bosses (having a three-dimensional shape) attached to a vehicle body so as to reduce air resistance by the principle of turbulent wing, could be obtained. Note that, the small bosses of the vortex generator generate stable small swirling flows by the principle of turbulent wing so as to restrain generation of unstable large swirling flows, so that the vortex generator is capable of restraining airflow separation, reducing air resistance, improving fuel efficiency and high-speed performance, reducing wind noise and improving drivability of the vehicle. Note that, even if the thickness of the adhesive sheet-shaped member 10 for airflow and sizes of the concaves and bosses constituting the rough surface are greater than those of the present embodiment, a certain degree of the aerodynamic effect can be obtained.

Places of adhering the adhesive sheet-shaped members 10 for airflow are not limited to the surface of the car as shown in FIGS. 3 and 5 and a surface of a train, so the sheet-shaped members, of course, may be adhered to other objects moving in the air, e.g., airplanes, ships. Further, by providing the adhesive sheet-shaped members 10 for airflow of the present invention to, for example, an air-inlet of an air cleaner for air suction of a vehicle engine so as to restrain the above described airflow separation, reduce air resistance and improve engine performance, the sheet-shaped members, of course, can be widely used to reduce air resistance caused by airflow.

Next, the structures, functions and effects of the adhesive sheet-shaped member 10 for airflow of the present invention will be clearly explained on the basis of results of running tests of a vehicle.

The adhesive sheet-shaped member 10 for airflow of the present invention is a sheet-shaped member, which is made thin as far as possible so as not to generate air resistance and which will be adhered on a surface of a vehicle in contact with airflow, and composed of a material capable of charging negative static electricity, the sheet-shaped member is formed in a long sheet shape in the flow direction of the airflow, compared to the width direction of the airflow, so as to be adhered along the direction of the airflow, and the sheet-shaped member is composed of a material which charges negative static electricity and whose ease of charging static electricity is different from that of the surface of the vehicle body in contact with airflow.

In the present invention, small swirling flows are suitably generated on the outer surface of the adhesive sheet-shaped member 10 for airflow, so it is thought that air resistance can be reduced as described above. Note that, for example, the surface in contact with airflow, which is capable of friction-charging negative static electricity, is a surface of a vehicle body painted with urethane paint.

In a concrete embodiment, a base material of the surface of the vehicle body in contact with airflow is urethane, and a base material of the sheet-shaped member is polyvinyl chloride.

In the present embodiment, a difference between ease of charging static electricity of urethane and that of polyvinyl chloride is comparatively small, so it is thought that smaller swirling flows are easily generated on the outer surface of the adhesive sheet-shaped member 10 for airflow which is the surface of polyvinyl chloride and that generating integrated large swirling flows can be restrained, so that air resistance can be reduced. Note that, polyvinyl chloride more easily charge negative electricity than urethane.

By the way, other materials, e.g., polypropylene, may be employed, instead of polyvinyl chloride, as the material of the adhesive sheet-shaped member 10 for airflow.

Note that, as to relationship between the material of the surface in contact with airflow, chargeability of the material of the sheet-shaped member and aerodynamic effects, an electric characteristic caused by difference of static electricity gives a certain aerodynamic effect as far as the eases of charging electricity are not equal. It is thought that if difference of chargeability is too great, too large swirling flows will be generated, and that if the difference of chargeability is too small, a line of linear airflows, which are generated by suitable-sized small swirling flows, cannot be generated.

In a further concrete embodiment, a synergy effect of suitably generating small swirling flows on the outer surface of the adhesive sheet-shaped member 10 for airflow is obtained by the rough surface of the sheet-shaped member and the above described effect of static electricity. Note that, the rough surface includes concaves and bosses, whose depth and height are not greater than the thickness of the adhesive sheet-shaped member 10 for airflow, and it is not a flat and smooth surface like a mirror surface. Namely, the rough surface includes a surface in which concaves and bosses form geometric shapes or patterns. Even if the outer surface of the adhesive sheet-shaped member 10 for airflow is a flat and smooth surface, a certain aerodynamic effect can be obtained by the above described function of static electricity.

The adhesive sheet-shaped member 10 for airflow relating to the present invention is characterized by its thickness of about 0.2 mm or less; thus, another sheet-shaped member having a thickness of around 0.1 mm or less, e.g., 0.08 mm, was tested, and it was found that an equivalent effect could be obtained.

The sheet-shaped member is very thin and does not become air resistance, so it is thought that generating turbulent flows by a thickness of an outer circumference part of the sheet-shaped member can be prevented, that small swirling flows can be suitably generated on the outer surface of the adhesive sheet-shaped member 10 for airflow and that air resistance can be reduced.

The adhesive sheet-shaped member 10 for airflow of the present invention is characterize in that the planar front-end part in contact with the airflow is rounded and that the rear end part in contact with the airflow is gradually made thinner. With this structure, the adhesive sheet-shaped member 10 for airflow of the present invention may be formed into shapes shown in FIGS. 6 and 7, and the shape, of course, may be optionally selected according to use conditions. Note that, the adhesive sheet-shaped member 10 for airflow shown in FIG. 1 is capable of suitably generating small swirling flows on the outer surface thereof, and it can be easily downsized.

The adhesive sheet-shaped member for airflow may be characterized in that the both end parts in contact with the airflow may be gradually made thinner toward the ends. Namely, the adhesive sheet-shaped member for airflow of the present invention is formed into the long sheet shape in the flow direction of the airflow (the direction from an upstream side to a downstream side), and the both end parts of the sheet-member are gradually made thinner toward the ends as shown in FIGS. 4, 6, 7, 8 and 9. Further, in each of the embodiments shown in FIGS. 4, 6, 7 and 9, the sheet-shaped member is symmetrically formed on the drawing, the sheet-shaped member may be adhered such that the longitudinal direction of the sheet-shaped member is directed in the flow direction of the airflow and directions of the both ends of the sheet-shaped member may be turned at 180 degrees. By employing these sheet-shaped members, oppositely adhering the sheet-shaped member with respect to the longitudinal direction can be prevented.

The sheet-shaped member 10 for airflow, of course, may be made in various colors to correspond to a surface of an object in contact with airflow (e.g., surface of a travel vehicle body), and it may be transparentized so as to correspond to surfaces made in various colors. It is thought that the base material of the transparent sheet-shaped member 10 for airflow includes no color substances, so the material (the base material) easily and effectively represents electrical characteristics, etc.

The preferred embodiments of the present invention have been explained, but the present invention is not limited to the above described embodiments, and many modifications may be performed without deviating the scope of the invention.

EXPLANATION OF SYMBOLS 10 the adhesive sheet-shaped member
10a the adhesive layer
10b the release paper
11 the planar front-end part
12 the planer rear end part
13 the outer surface of the adhesive sheet-shaped member

The invention claimed is:

1. An adhesive sheet-shaped member for air flow being made thinly, as far as possible, so as not to become air resistance and being adhered to a place close to an end of a member which constitutes a surface in contact with an airflow and which is composed of a material charging negative static electricity,
  wherein the sheet-shaped member is formed in a long sheet shape in a flow direction of the airflow, compared to a width direction of the airflow, so as to be adhered along the direction of the airflow, at least three of the sheet-shaped members are capable of being adhered, in parallel in the width direction, on the surface in contact with the airflow, with clearances in each of which no sheet-shaped member having a width greater than that of the sheet-shaped member cannot be adhered,
  wherein the sheet-shaped member is composed of a material which charges negative static electricity and which can more easily negatively charge than the surface in contact with the airflow,
  wherein an outer surface of the sheet-shaped member which will contact the airflow is a rough surface,
  wherein an adhesive layer is provide to a rear surface, which acts as an adhesive surface, of the sheet-shaped member, a thickness of the sheet-shaped member including the adhesive layer is 0.2 mm or less, and
  wherein a planar shape of a rear end part of the outer surface in contact with the airflow of the sheet-shaped member is gradually made thinner toward the rear end.

2. The adhesive sheet-shaped member for air flow according to claim 1, wherein a base material of the surface in contact with the airflow is urethan, and a base material of the sheet-shaped member is polyvinyl chloride.

3. The adhesive sheet-shaped member for air flow according to claim 1, wherein a planar shape of a front-end part of the outer surface in contact with the airflow of the sheet-shaped member is rounded.

4. The adhesive sheet-shaped member for air flow according to claim 1, wherein a planar shape of a front-end part of the outer surface in contact with the airflow of the sheet-shaped member is gradually made thinner toward the front-end.

5. A travel vehicle using an adhesive sheet-shaped member, wherein at least three of the sheet-shaped members of claim 1 are adhered, in parallel in a width direction, on a surface of a vehicle body, in contact with an airflow, with clearances in each of which no sheet-shaped member having a width greater than that of the sheet-shaped member cannot be adhered.

* * * * *